US008698870B2

United States Patent
Wan et al.

(10) Patent No.: US 8,698,870 B2
(45) Date of Patent: Apr. 15, 2014

(54) COMMUNICATION METHOD AND APPARATUS FOR USER TERMINAL

(75) Inventors: Bin Wan, Beijing (CN); Yanglin Zhou, Beijing (CN); Zhongliang Miao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1356 days.

(21) Appl. No.: 12/325,363

(22) Filed: Dec. 1, 2008

(65) Prior Publication Data

US 2009/0144779 A1 Jun. 4, 2009

(30) Foreign Application Priority Data

Dec. 4, 2007 (CN) .......................... 2007 1 0178716

(51) Int. Cl.
*H04N 7/14* (2006.01)
(52) U.S. Cl.
USPC .................. 348/14.02; 348/14.08; 348/14.12; 348/14.13
(58) Field of Classification Search
USPC .............. 348/14.01–14.16; 455/550.1, 556.1, 455/556.2; 370/260, 261, 352
See application file for complete search history.

(56) References Cited

U.S. PATENT DOCUMENTS

| 7,864,693 | B2 * | 1/2011 | Burman et al. | 370/252 |
| 2005/0088513 | A1 * | 4/2005 | Oswald et al. | 348/14.02 |
| 2006/0002373 | A1 * | 1/2006 | Denny | 370/352 |
| 2008/0049725 | A1 * | 2/2008 | Rasanen | 370/352 |

FOREIGN PATENT DOCUMENTS

CN 1559040 A 12/2004

* cited by examiner

*Primary Examiner* — Melur Ramakrishnaiah
(74) *Attorney, Agent, or Firm* — Kinney & Lange, P.A.

(57) ABSTRACT

A communication method and apparatus for a user terminal provided in the present invention can detect the user terminal, obtain first capability information on a video communication of a wireless network, and second capability information on the video communication of said user terminal, process the first capability information and the second capability information to generate video communication capability indication information, and select one of operations to perform according to said video communication capability indication information, said operations including enabling a video session or enabling the video session after closing at least a part of applications being used by said user terminal or enabling an audio session. Such a processing scheme of the communication for a user terminal is of high efficiency, with a clear process and can be easily optimized, with an improved success rate for establishing a video session at a time.

10 Claims, 1 Drawing Sheet

COMMUNICATION METHOD AND APPARATUS FOR USER TERMINAL

BACKGROUND OF THE INVENTION

1. Field of Invention

The present invention relates to wireless communications, in particular to a communication method and apparatus for a user terminal.

2. Description of Prior Art

With the development of communication technology, video sessions have become conventional configurations for 3G mobile phones. However, in the existing video session establishment schemes for 3G mobile phones, the establishment procedure for the video session is independent of the establishment procedure for voice communication. A calling user terminal cannot be supplied with necessary prompts and guides after a call failure, such that the user will continue to make the call vainly in the case that the current processing resources cannot meet the video session conditions. As a result, this kind of communication method is defective and is not flexible enough. It may significantly impair user satisfaction, while wasting a great deal of communication processing resources.

SUMMARY OF THE INVENTION

In view of the above problems, an object of the present invention is to provide a communication method and apparatus for a user terminal, which may use communication resources effectively and improve flexibility of the communication while improving the user satisfaction.

In order to achieve this, a technical solution of the present invention is implemented by: a2

A communication method for a user terminal comprising the steps of: detecting said user terminal; obtaining first video communication capability information of a wireless network, and second video communication capability information of said user terminal;

processing said first video communication capability information and said second video communication capability information, so as to generate video communication capability indication information; and selecting one of a plurality of operations to perform according to said video communication capability indication information, said operations including enabling a video session or enabling the video session after closing at least a part of applications being used by said user terminal or enabling an audio session.

In an exemplary embodiment, enabling a video session includes:

applying a MONA (Media Oriented Negotiation Acceleration) scheme to enable a call establishment procedure for the video session.

In an exemplary embodiment, said second capability information includes session processing resources of said user terminal. In an exemplary embodiment, the step of obtaining the session processing resources is for a calling user terminal among the user terminals. In an exemplary embodiment, closing the applications includes:

closing the applications actively; alternatively, issuing a prompt according to a result of detecting the session processing resource, and closing the applications according to a received feedback.

In an exemplary embodiment, enabling an audio session includes establishing the audio session by applying a preparation having been made for the video session.

In an exemplary embodiment, the method further comprises:

proceeding to a connection failure processing procedure and issuing a connection failure prompt, when both of the video session and the audio session cannot be established successfully.

In an exemplary embodiment, said first capability information is the session resource of the wireless environment.

Another aspect of the technical solution of the present invention is implemented by a user terminal comprising:

a detecting unit for detecting said user terminal, and for obtaining second video communication capability information of said user terminal;

an obtaining unit for obtaining first video communication capability information of a wireless network; and a processing unit for processing said first video communication capability information and said second video communication capability information, so as to generate video communication capability indication information; and for selecting one of a plurality of operations to perform according to said video communication capability indication information, said operations including enabling a video session or enabling the video session after closing at least a part of applications being used by said user terminal or enabling an audio session.

In an exemplary embodiment, said detecting unit and said obtaining unit are arranged in a preprocessing module of said user terminal.

In an exemplary embodiment, said processing unit comprises a preprocessing module and an audio-video processing module; wherein, said preprocessing module is adapted to process said first video communication capability information and said second video communication capability information, so as to generate video communication capability indication information, and adapted to control said audio-video processing module to select one of operations to perform according to said video communication capability indication information, said operations including enabling a video session or enabling the video session after closing at least a part of applications being used by said user terminal or enabling an audio session; and said audio-video processing module is adapted to select one of operations to perform under control of said preprocessing module, said operations including enabling a video session or enabling the video session after closing at least a part of applications being used by said user terminal or enabling an audio session.

In an exemplary embodiment, said user terminal is a 3G-324M terminal.

In this way, the communication method and apparatus for a user terminal provided in the present invention may have the following functionalities: detecting said user terminal; obtaining first capability information on a video communication of a wireless network, and second capability information on the video communication of said user terminal; processing said first capability information and said second capability information, so as to generate video communication capability indication information; and selecting one of operations to perform according to said video communication capability indication information, said operations including enabling a video session or enabling the video session after closing at least a part of applications being used by said user terminal or enabling an audio session.

Such a processing scheme of communication for a user terminal is of high efficiency, with a clear process and can be easily optimized, with an improved success rate of establishing a video session.

In view of this, the communication method and apparatus for a user terminal provided in the present invention can use

DETAILED DESCRIPTION OF PREFERRED EMBODIMENTS

The technology of the present invention will be described in detail, in combination with the drawings.

Figure 1:
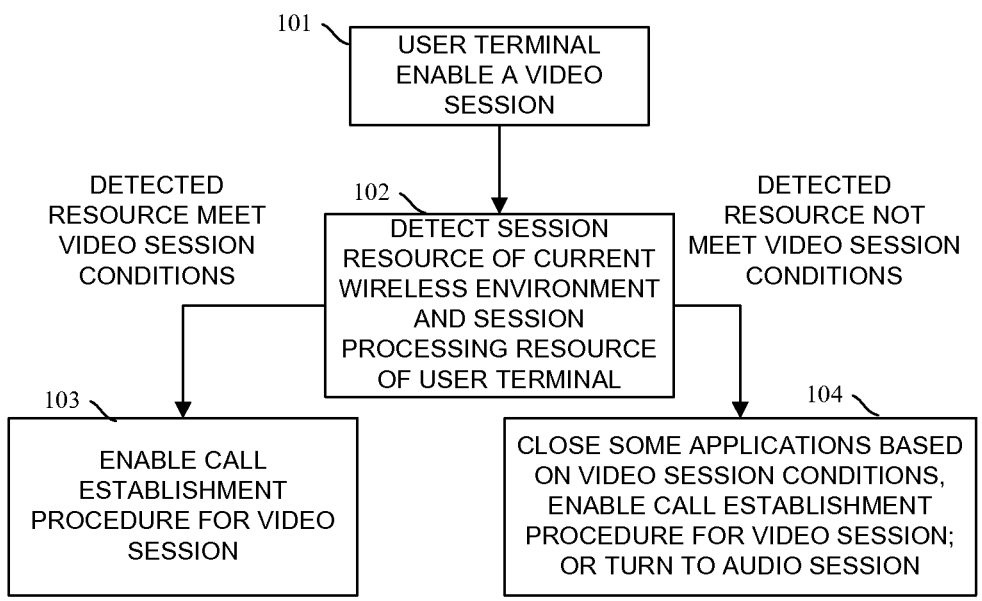
FIG. 1 shows a brief diagram for a communication procedure of a user terminal according to the present invention.

Referring to FIG. 1, FIG. 1 is a brief diagram for a communication procedure of a user terminal according to the present invention, which comprises the following steps:

steps 101-102 of detecting the session resource of the current wireless environment and the session processing resource of the user terminal, when a video session is enabled by the user terminal.

Said session resource of the wireless environment may be obtained from a wireless network controller (RNC) and other communication devices, and may be the number of idle channels. The session processing resource of the user terminal may be obtained from a memory management module, a CPU (Central Processing Unit) and other user terminal management components, and may be a usage of the CPU and/or the memory, etc.

In particular, said detecting may be implemented by a preprocessing module arranged in the user terminal. The detected resource of the user terminal may be classified into three levels, i.e. I-A, I-B and l-C:

I-A, in which the user terminal resource may support a video session;

I-B, in which the user terminal resource cannot support a video session, and only can support a video session after some applications have been closed;

I-C, in which the user terminal resource cannot support a video session, and only can support an audio session.

In addition, the preprocessing module may detect the session processing resource at the current air interface by interacting with a resource management module in the RNC (mainly detecting current idle status of network channels in the wireless resource of the access network and current processing capability margin of the access network), and may classify the detected session resource of the wireless environment into two levels, i.e. II-A and II-B:

II-A, in which the network is idle, so that a video session can be established;

II-B, in which the network is busy, thereby a call is forbidden.

In step 103, a call establishment procedure for a video session is enabled, when the detected resource meets the video session conditions.

In particular, if parameters classified as I-A and II-A are detected, a video session may be established immediately by applying the current generic MONA scheme.

In step 104, when the detected resource does not meet the video session conditions, applications are closed based on the video session conditions, and then a call establishment procedure for a video session is enabled; or an audio session is enabled instead.

In particular, if the obtained parameter is classified as I-B, a prompt of "enable a video session by closing some applications" or "turn to an audio session" may be issued, and a next operation will be carried out as follows based on a received feedback of closing the applications or of turning to an audio session: closing the applications based on the video session conditions or the feedback of closing the applications, and then enabling a video session; or applying a preparation having been made for the video session, such as an already opened communication channel, to enable an audio session instead.

Of course, the preprocessing module in said user terminal (it may be referred as a calling user terminal, so as to facilitate distinguishing it from other terminals) initiating a video call may further interact with the preprocessing module in the called user terminal, in order to obtain the current state and resource information of the called user terminal, and may classify the current state and resource information of the called user terminal as five levels, i.e. III-A, III-B, III-C, III-D and III-E:

III-A, in which the called user terminal resource may support a video session;

III-B, in which the called user terminal resource cannot support a video session, but can support an audio session;

III-C, in which the machine type of the called user terminal cannot support a video session, but can support an audio session;

III-D, in which the resource of the called user terminal cannot support an audio session;

III-E, in which the called user terminal shuts down, or is out of the service area.

When the obtained parameters are classified as III-A and III-B or III-C, a prompt of "the called user terminal cannot support a video session, and would you like to turn to an audio session" or "the machine type of the called user terminal cannot support a video session, and would you like to turn to an audio session" may be issued, and a preparation having been made for the video session may be applied to enable an audio session instead, according to a received feedback of turning to an audio session.

In the practical applications, there is a case in which both of the video session and the audio session cannot be established successfully, such as a case when the parameters classified as II-B, III-D and III-E are obtained. In this case, the calling user terminal may proceed to a connection failure processing procedure, and issue a connection failure prompt.

It should be noted that, the calling user terminal may issue a corresponding prompt, irrespective of which one of the video session establishment procedure, the audio session establishment procedure and the connection failure processing procedure the calling user terminal finally proceeds to.

Figure 2:
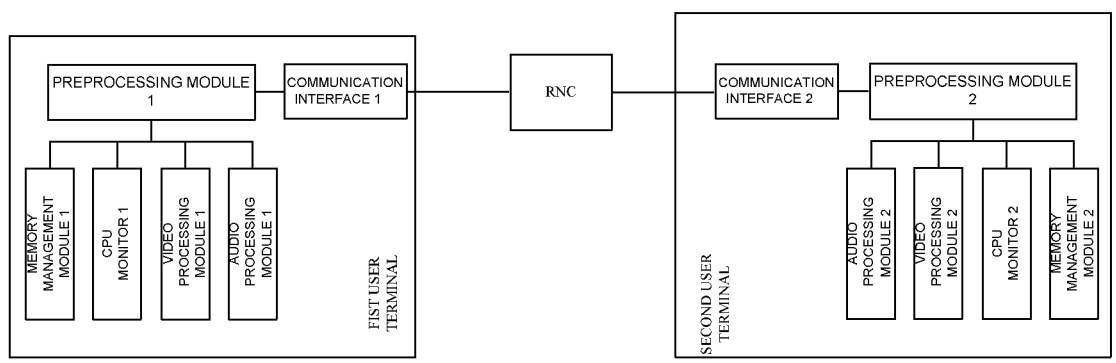
FIG. 2 is a diagram of a communication apparatus for a user terminal according to one embodiment of the present invention.

The configuration of FIG. 2 should be set in order to achieve the procedure as shown in FIG. 1. Referring to FIG. 2, a diagram of a communication apparatus for a user terminal according to one embodiment of the present invention is shown. In FIG. 2, a first user terminal is connected to a second user terminal via a RNC. The first user terminal comprises a preprocessing module 1 and a communication interface 1, both of which are connected with each other. The first user terminal further comprises a memory management module 1, a CPU monitor 1, a video processing module 1 and an audio processing module 1, all of which are connected to the preprocessing module 1. The second user terminal comprises a preprocessing module 2 and a communication interface 2, both of which are connected with each other. The second user terminal further comprises a memory management module 2, a CPU monitor 2, a video processing module 2 and an audio processing module 2, all of which are connected to the preprocessing module 2. Among the other things, the communication interface 1 is responsible for processing communications between components of the first user terminal and external devices, and the communication interface 2 is responsible for processing communications between components of the second user terminal and external devices.

The first user terminal may perform the same operations as the second user terminal. In the following, the first user terminal is illustrated as a calling party by way of an example, to explain the communication procedure achieved by the user terminal.

In the specific applications, the preprocessing module 1 detects the session resource of the wireless environment from a RNC and other communication devices, and further detects the session processing resource of the user terminal from the memory management module 1, the CPU monitor 1 and other user terminal management components. The preprocessing module 1 classifies the detected session resource of the wireless environment as two levels, i.e. II-A and II-B, and further classifies the detected resource of the user terminal as three levels, i.e. I-A, I-B and I-C.

The preprocessing module 1 controls the video processing module 1 by sending a command to enable a call establishment procedure for a video session, when the detected resource meets the video session conditions. When the detected resource does not meet the video session conditions, some applications may be closed based on the video session conditions, for example an upper layer application module connected thereto is controlled by sending a command to close the applications, and the video processing module 1 is controlled by sending a command to enable a call establishment procedure for the video session; alternatively, the audio processing module 1 is controlled by sending a command to enable an audio session, for example the audio processing module 1 is controlled to apply a preparation having been made for a video session to turn to enable an audio session.

The preprocessing module 1 may further interact with the preprocessing module 2, so as to obtain the current state and the resources information of the second user terminal. The current state and the resources information of the second user terminal may be classified as five levels, i.e. III-A, III-B, III-C, III-D and III-E.

The preprocessing module 1 may control the audio processing module 1 to apply a preparation having been made for the vide session to turn to enable an audio session, when the obtained current state and the resources information of the second user terminal cannot support a video session but can support an audio session.

In the practical applications, there is a case in which both of the video session and the audio session cannot be established successfully, for example a case when parameters classified as II-B, III-D and III-E are obtained. In this case, the preprocessing module 1 proceeds to a connection failure processing procedure, and issues a connection failure prompt.

It should be noted that, the preprocessing module 1 may issue a corresponding prompt, such as "the called user terminal cannot support a video session, and would you like to turn to an audio session" or "the machine type of the called user terminal cannot support a video session, and would you like to turn to an audio session", and the like prompts, irrespective of which one of the video session establishment procedure, the audio session establishment procedure and the connection failure processing procedure the calling user terminal finally proceeds to.

In addition, said audio session is usually performed according to a received feedback corresponding to the prompt. Of course, a video session may also be converted into an audio session actively, when there is no enough resource.

In the practical applications, the memory management module 1 and the CPU monitor 1 may be referred as a user terminal resource management module together, and the video processing module 1 and the audio processing module 1 may be referred as an audio-video processing module together.

In the practical applications, the session resource of the wireless environment may be referred as first capability information, and a component for obtaining the first capability information may be referred as an obtaining unit, which may be arranged in the preprocessing module and the other communication entities. The session processing resource of the user terminal may be referred as second capability information, and a component for obtaining the second capability information may be referred as a detecting unit, which may be arranged in the preprocessing module and the other communication entities. In addition, a component for performing session-related operations may be referred as a processing unit, which generally includes a preprocessing module and an audio-video processing unit.

In addition, in order to unify the operations, a prompt generated for determining which kind of session is to be enabled may be referred as video communication capability indication information, based on which subsequent session operations are performed.

The user terminal may be a 3G-324M terminal, which can adopt a 3G application version of 3G-324G protocol or H.324M protocol to carry out a video session supported by a core network based circuit. The 3G application version of H.324M protocol mainly comprises H.245 control protocol, H.223 reuse protocol, video-audio coding protocol.

Based on the above, since the session resource of the current wireless environment and the session processing resource of the user terminal may be detected, a call establishment procedure for a video session may be enabled when the detected resource meets the video session conditions, and it is also possible to close some applications based on the video session conditions and then enable a call establishment procedure for a video session when the detected resource cannot meet the video session conditions. Obviously, such a classified processing scheme of the communication for a user terminal is of high efficiency, with a clear process and can be easily optimized, with an improved success rate of establishing a video session at a time. In addition, a failure reason and a recommendation may also be prompted, even if it is impossible to establish the video session.

In view of this, the communication method and apparatus for a user terminal provided in the present invention can use communication resources effectively and improve flexibility of the communication while improving the user satisfaction.

What is claimed is:

1. A communication method for a user terminal, comprising steps of:
   detecting said user terminal;
   obtaining first video communication capability information of a wireless network, and second video communication capability information of said user terminal;
   processing said first video communication capability information and said second video communication capability information to generate video communication capability indication information, and
   selecting one of a plurality of operations to perform according to said video communication capability indication information, said operations including enabling a video session or enabling the video session after closing at least a part of applications being used by said user terminal or enabling an audio session.

2. The method according to claim 1, wherein enabling the video session includes:
applying a media oriented negotiation acceleration (MONA) scheme to enable a call establishment procedure for the video session.

3. The method according to claim 1, wherein said second video communication capability information comprises session processing resources of said user terminal, and wherein, the step of obtaining the session processing resource is for a calling user terminal among the user terminals; and closing the applications includes:
actively closing the applications, or issuing a prompt according to a result of detecting the session processing resource, and then closing the applications according to a received feedback.

4. The method according to claim 1, wherein enabling the audio session includes:
establishing the audio session with a preparation having been made for the video session.

5. The method according to claim 1, further comprising:
proceeding to a connection failure processing procedure and issuing a connection failure prompt, when both of said video session and audio session cannot be establish successfully.

6. The method according to claim 1, wherein, said first video communication capability information is the session resource of the wireless environment.

7. A user terminal comprising:
a detecting unit for detecting said user terminal, and obtaining second video communication capability information of said user terminal;
an obtaining unit for obtaining first video communication capability information of a wireless network; and
a processing unit for processing said first video communication capability information and said second video communication capability information to generate video communication capability indication information, and for selecting one of a plurality of operations to perform according to said video communication capability indication information, said operations including enabling a video session or enabling the video session after closing at least a part of applications being used by said user terminal or enabling an audio session.

8. The user terminal according to claim 7, wherein said detecting unit and said obtaining unit are arranged in a preprocessing module of said user terminal.

9. The user terminal according to claim 7, wherein said processing unit comprises a preprocessing module and an audio-video processing module; wherein,
said preprocessing module is adapted to process said first video communication capability information and said second video communication capability information to generate the video communication capability indication information, and to control said audio-video processing module to select one of the plurality of operations to perform according to said video communication capability indication information, said operations including enabling a video session or enabling the video session after closing at least a part of applications being used by said user terminal or enabling an audio session; and
said audio-video processing module is adapted to select one of the plurality of operations to perform under control of said preprocessing module, said operations including enabling a video session or enabling the video session after closing at least a part of applications being used by said user terminal or enabling an audio session.

10. The user terminal according to claim 7, wherein said user terminal is a 3G-324M terminal.

* * * * *

UNITED STATES PATENT AND TRADEMARK OFFICE
CERTIFICATE OF CORRECTION

PATENT NO. : 8,698,870 B2
APPLICATION NO. : 12/325363
DATED : April 15, 2014
INVENTOR(S) : Bin Wan, Yanglin Zhou and Zhongliang Miao It is certified that error appears in the above-identified patent and that said Letters Patent is hereby corrected as shown below:

On the title page, item 73, Assignee
Insert --Beijing Lenovo Software Ltd., Beijing (CN)-- under "Lenovo (Beijing) Limited"

Signed and Sealed this
Second Day of February, 2016

Michelle K. Lee
*Director of the United States Patent and Trademark Office*